Dec. 2, 1969   E. W. KAISER ET AL   3,481,809
METHOD OF AND APPARATUS FOR MAKING SOLDERLESS CAN BODY BLANKS
Filed Sept. 13, 1965   3 Sheets-Sheet 1

INVENTERS
EDWARD WILLIAM KAISER
ARNOLD ROBERT REIN
RICHARD OTTO WAHLER
BY
Leonard R. Kohan
ATTORNEY

INVENTORS
EDWARD WILLIAM KAISER
ARNOLD ROBERT REIN
RICHARD OTTO WAHLER
BY

ATTORNEYS

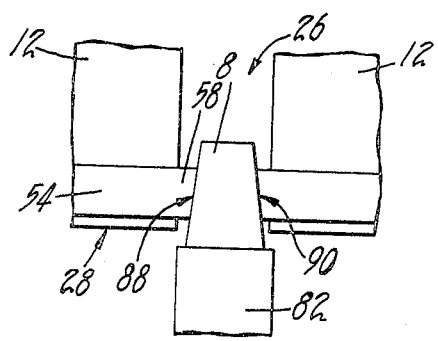
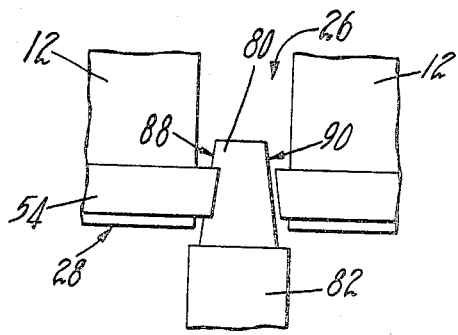
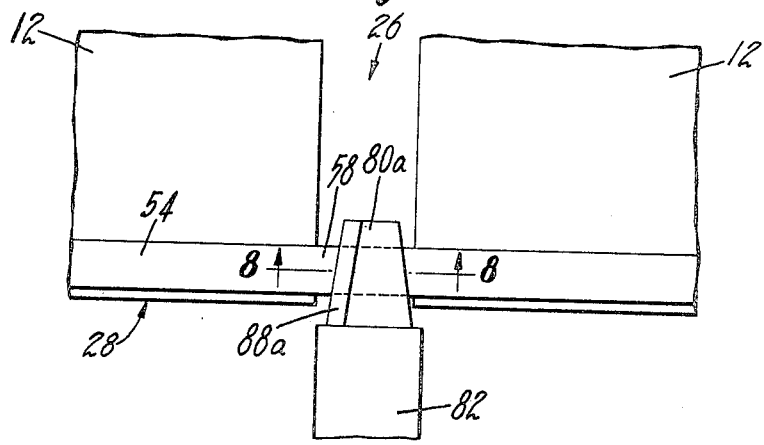
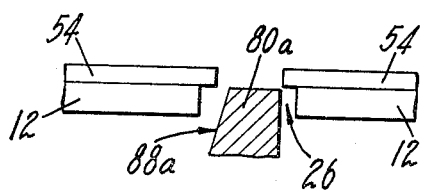
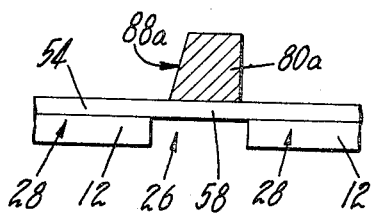

United States Patent Office 3,481,809
Patented Dec. 2, 1969

3,481,809
METHOD OF AND APPARATUS FOR MAKING SOLDERLESS CAN BODY BLANKS
Edward William Kaiser, Northbrook, Ill., Arnold Robert Rein, Menasha, Wis., and Richard Otto Wahler, Rolling Meadows, Ill., assignors to American Can Company, New York, N.Y., a corporation of New Jersey
Filed Sept. 13, 1965, Ser. No. 486,994
Int. Cl. B65d 7/38, 7/42
U.S. Cl. 156—231     18 Claims

ABSTRACT OF THE DISCLOSURE

Can body blanks to be used to make cemented lap side seam containers are provided with adhesive material on the marginal edge surfaces thereof at high speeds, the adhesive being precisely applied in amount and location. A ribbon of adhesive is extruded onto a transfer roll which is rotated so that its periphery has the same linear velocity as the moving blanks, the transfer roll being maintained at a substantially lower temperature than that of the blanks so that the adhesive passes onto the blanks.

---

The present invention relates to the manufacture of blanks for container bodies having lap side seams cemented together with a thermoplastic resin composition, and more particularly to an improved method of and apparatus for applying an extruded cement mateiral along a marginal edge portion of a can body blank.

The greatest proportion by far of the metal containers used for commercial packaging of foods and beverages are the familiar three-piece tin plate cans which include a hook seamed can body with the seam being hermetically sealed by a metallic solder. However, solder sealed can bodies have certain recognized limitations, namely that they must be made from materials which are readily soldered and, in the case of can bodies having lithographed labels, that a wide strip on each side of the seam must be maintained free of lithography in order to perform the soldering operation.

It has heretofore been proposed that these limitations can be overcome by employing an adhesive resin composition in place of the metallic solder, thereby making possible, for example, an aluminum can body with a lithographed label applied directly upon and covering its entire outer surface. One of the manufacturing problems with a can body of this type is the deposition of the resin cement in the proper amount and position on the body blank so that when the seam is formed, all surfaces thereof will be fully bonded and at the same time there is a minimum of undesirable squeezing out of quantities of excess material along random portions of the seam. Precise application of the cement in amount and location is particularly a problem in producing blanks in a commercially acceptable manner which requires that the resin cement be applied automatically and continuously at a high rate of speed.

Methods which have heretofore been proposed for applying adhesive cements to seam portions of a can body blank involve either the extrusion of molten cement directly upon the side seam edge portion, or alternatively affixing to the side seam edge portion a length of solid preformed tape or strip composed of a natural or synthetic thermoplastic resin material. However, neither of these methods has been considered wholly satisfactory. The direct extrusion of thermoplastic cement in a semi-molten flowable condition on side seam edge portions of a moving procession of blanks generally necessitates that the extrusion be interrupted when a blank completes its passage beneath the nozzle and until the next blank is in position beneath the nozzle, with the attendant problems of control of the flow and uniformity of distribution of the extruded material. Employing a preformed tape or strip of thermoplastic material requires additional processing steps for forming the tape and consequently entails a higher cost of manufacture.

Accordingly, an object of the present invention is to provide an improved method of depositing extruded cement material on a seam portion of a body blank which will overcome the problems hereinbefore pointed out.

Another object is to provide such a method which can be utilized for applying extruded adhesive cement to seam portions of body blanks made from metallic or non-metallic materials or combinations thereof.

Another object is to provide such a method wherein the extrusion of the semi-molten cement material is continuous and uninterrupted.

Another object is to proivde such a method wherein it is unnecessary to extrude the semi-molten cement material directly upon the seam portion of a body blank.

Another object is to provide such a method wherein the placement and distribution of the extruded cement on the seam portion of a body blank is easily and automatically controllable.

Another object is to provide an improved apparatus for depositing a continuously extruded ribbon of semi-molten cement on the seam portions of a moving procession of container body blanks.

A further object is to provide such an apparatus wherein the location and distribution of the cement material on the seam portions of the body blanks can be properly controlled.

Still a further object is to provide such an apparatus which will produce individual body blanks having cement adhesive on a marginal edge thereof in a desired location and amount.

Yet a further object is to provide such an apparatus which is capable of high speed automatic operation.

Numerous other objects and advantages of the invention will be apparent as it is better understood from the following description, which, taken in connection with the accompanying drawings, discloses a preferred embodiment thereof.

Referring to the drawings:

FIGURES 5 and 6 are schematic plan views showing the relation of the cutter element and the solidified cement strip immediately prior to and at the completion of the passage of the cutter element through the strip respectively.

FIGURE 7 is a schematic plan view of a modified cutter element showing the relation of the cutter element and the solidified cement strip immediately prior to the passage of the cutter element through the strip.

FIGURE 8 is fragmentary sectional view taken substantially along the line 8—8 of FIGURE 7.

FIGURE 9 is a view similar to FIGURE 8 showing the relation of the cutter element at the completion of its passage through the solidified cement strip.

The aforementioned objects are accomplished in the present invention by supporting container blanks in a uniformed spaced relation on a conveyor with marginal edges thereof maintained in alignment. As the blanks are moved along a path of travel by the conveyor at a uniform speed, surfaces adjacent the marginal edges are heated to a predetermined desired temperature. Subsequently, the heated marginal edge surfaces pass between a pair of driven rolls moving at a peripheral speed which is the same as the speed of the conveyor. A semi-molten heat sensitive resin material is extruded at a uniform rate upon the surface of one of the rolls which thereupon carries the extruded strip into contact with the heated marginal surface of the blank. Preferably, this transfer roll has provision for passing a coolant internally therethrough to maintain the surface thereof at a substantially lower temperature than the temperature of the marginal edge surfaces of the blank. By virtue of this temperature difference, a substantially greater cohesive force is created between the extruded strip and the heated marginal surface of the blank as compared to the cohesive force existing between the extruded strip and the transfer roll. Consequently, the extruded strip of cement coming into contact with the marginal edge surfaces of the blank preferentially adheres to the blank and separates from the transfer roll. If desired, the cement strip may be reduced in thickness while still in the heat softened condition by passing the marginal edge surfaces of the blanks having the cement strip thereon through one or more pairs of driven pinch rollers moving at a peripheral speed which is the same as the speed of the conveyor.

The cement strip which has been deposited upon the marginal surfaces of the blanks and joins adjacent blanks by bridging the spaces therebetween is next cooled to a relatively solid self-supporting state by passing the marginal edge surfaces with the strip thereon through a chamber which impinges cool air upon the strip. A cutter element then severs the bridging portions of the solidified cement strip to produce the individual blanks. The cutter element is moved at a relatively very high speed as compared to the movement of the blanks so that the cutter effects the removal of a part of the bridging portion of the cement strip without coming into contact with the blanks themselves, and without interruption to the continuous uniform movement of the blanks along the path of travel.

Figure 1:
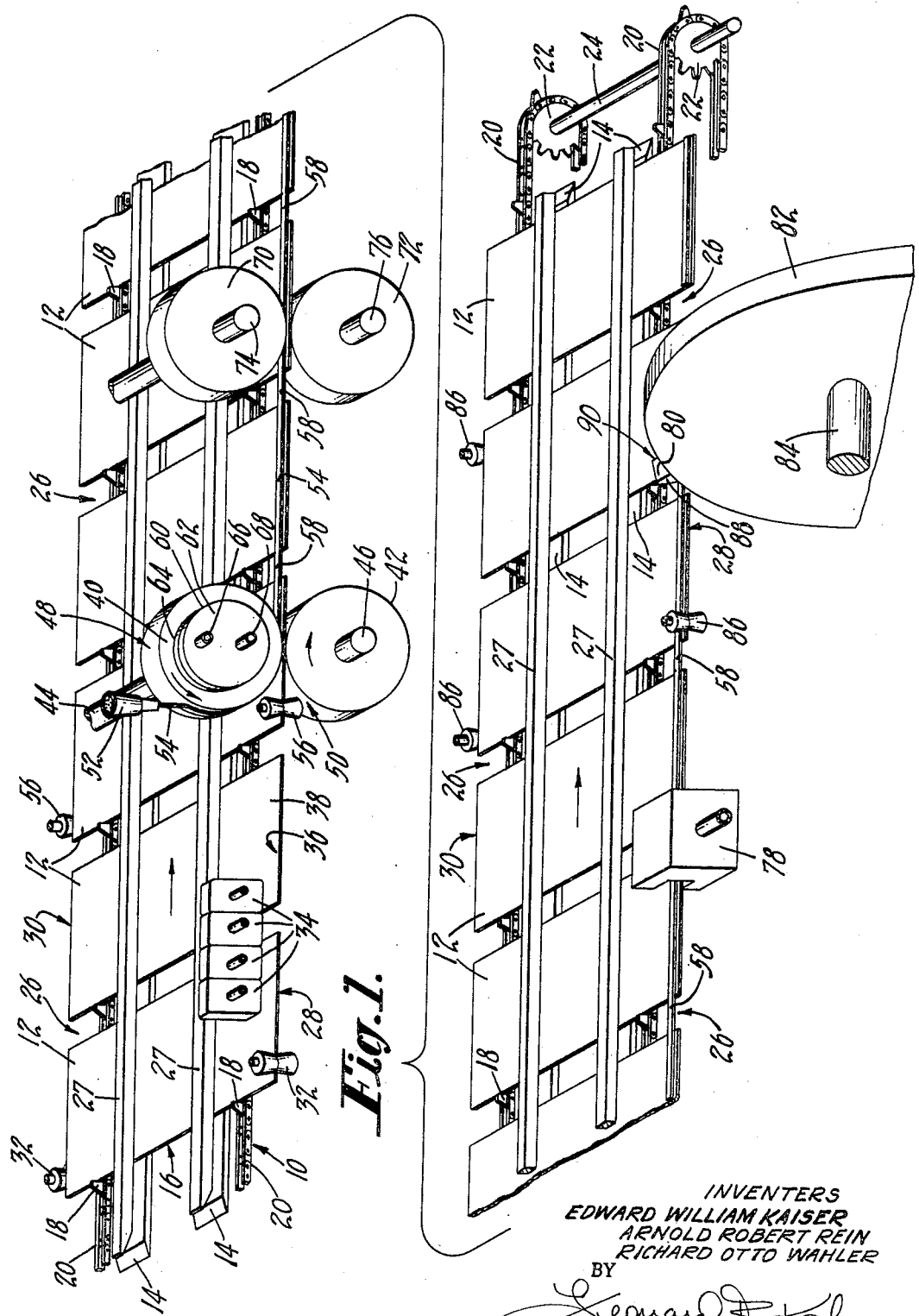
FIGURE 1 is a perspective view of an apparatus embodying the features of the present invention.

As a preferred or exemplary embodiment of the instant invention, FIG. 1 shows a conveyor generally designated 10 for moving a procession of rectangular blanks 12 along a path of travel from left to right as shown. The blanks 12 are individually delivered by a conventional blank feeding mechanism on to supporting rails 14 which are fixedly mounted to a conveyor supporting frame (not shown). As each blank 12 is deposited upon the supporting rails 14, the trailing edge 16 of the blank is engaged by a pair of lugs 18 which are mounted on chains 20. The chains 20 are suitably supported in conventional chain guides (not shown) and are pulled to the right in unison and at a uniform speed by sprockets 22 which are keyed to a drive shaft 24. A power source (not shown) is suitably connected to the drive shaft 24 to provide the conveyor motivating power.

The lugs 18 are affixed to the chains 20 at fixed spacings which are greater than the uniform widths of the blanks 12 as measured in their direction of movement. Also, the lugs 18 on each chain 20 are maintained in transverse alignment perpendicular to the direction of movement of the blanks 12 by appropriate positioning of the sprockets 22 on the drive shaft 24. Consequently, a uniform spacing 26 between adjacent blanks 12 is maintained as the blanks are moved along the conveyor. Upper guide rails 27 fixedly mounted to the conveyor frame prevent any upward displacement of the blanks 12.

As a blank 12 is conveyed along the path of travel, side edges 28 and 30 are engaged by guide rollers 32 which move the blanks into a desired position on the conveyor with the side edges of the respective blanks in linear alignment. The aligned blanks 12 are then conveyed past gas-fired radiant heating elements 34 fixedly mounted in a position whereby radiant heat is directed against a surface 36 of a side seam marginal edge portion 38 of the blanks adjacent the side edge 28 to heat the surface 36 to a predetermined elevated temperature. The heating elements 34 are provided with suitable valving and controls connected to a temperature sensing device (not shown) to automatically control the temperature to which the marginal surface 36 is heated. The components employed to achieve such automatic temperature control may be selected from available equipment well known to persons skilled in the art.

Immediately upon leaving the heating elements 34, the marginal edge portion 38 of a blank 12 passes between a transfer roller 40 and a back-up roller 42. These rollers 40 and 42 are mounted on respective shafts 44 and 46 which are positively driven through a coupling connected to the conveyor power source so that the peripheral speeds of the respective surfaces 48 and 50 are the same as the speed at which the blanks 12 are moved by the conveyor. The rollers 40 and 42 are suitably mounted to provide rolling contact between the surface 50 of the back-up roller 42 and the surface of the marginal edge portion 38 opposite the heated surface 36, and to provide a predetermined spacing between the surface 48 of the transfer roller 40 and the heated marginal surface 36 of the blank.

An extruder 52 positioned adjacent the surface 48 of the transfer roller 40 continuously extrudes, at a substantially uniform linear rate, a ribbon 54 of an adhesive resin composition. The ribbon 54 is preferably a thermoplastic material which is at an elevated temperature and in a semi-fluid or soft, plastic movable condition when extruded, and which hardens to substantially a rigid relatively non-movable condition when cooled to normal room temperature.

The ribbon 54 is directed into contact with the surface 48 of the transfer roller 40 and in its extruded form tends to adhere with a substantial cohesive force to the roller surface. The transfer roller 40 then carriers the ribbon 54 into contact with the heated marginal surface 36 of the blank 12, whereupon the ribbon is pressed into engagement with the heated marginal surfaces between the coating rollers 40 and 42 (FIG. 2).

Preferably, the ribbon 54 is extruded from the extruder 52 at a linear rate which is less than the peripheral speed of the surface 48 of the transfer roller. Consequently, a stretching force is exerted on the free portion of the ribbon between the position at which it leaves the extruder 52 and the position at which the ribbon comes into contact with the surface 48 of the transfer roller. The ribbon 54 is thereby continuously and substantially uniformly decreased in cross-section to minimize the effects of variations in the cross-section of the ribbon 54 as extruded resulting from vibrations or pressure fluctuations which may occur during the extruding process. Moreover, the slight tension on the free portion of the extruded ribbon minimizes the possibility of transverse shifting of the point of contact of the extruded ribbon 54 on the roller surface 48, and consequent shifting of the location at which the ribbon is deposited upon the marginal surface 36 of the blanks.

A pair of guide rollers 56 engage the side edges 28, 30 of the blank immediately ahead of the rollers 40, 42 to insure that the edge 28 is in a desired alignment with respect to the transfer roller 40. Additionally, the extruder 52 is positioned with respect to the surface 48 of the transfer roller 40 so as to deposit the extruded ribbon in a desired location thereon. Consequently, the ribbon 54 is brought into contact with the heated marginal surface 36 of the blank along a predetermined area thereof. If desired, the rollers 56 may be adjustably mounted to facilitate rapid adjustment of the location of the extruded ribbon 54 with respect to the side edge 28 of the blank.

Figure 2:
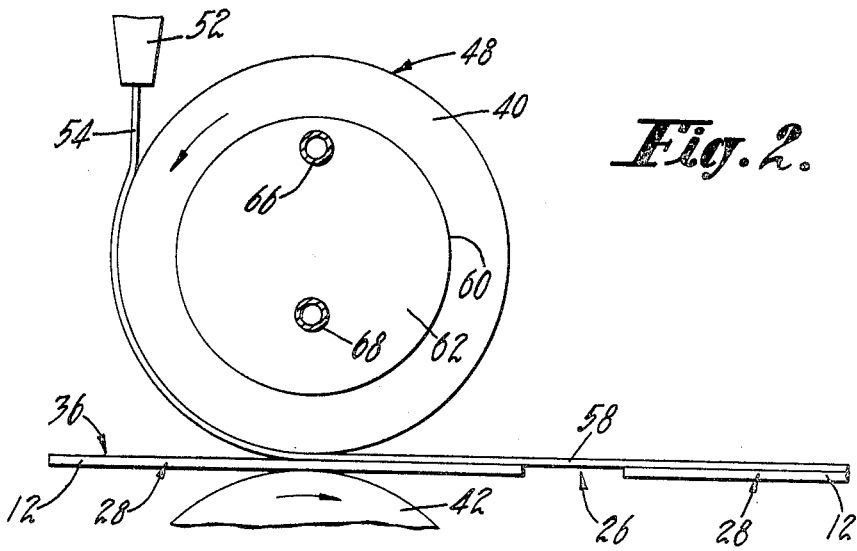
FIGURES 2, 3 and 4 are schematic side views showing the relation of the transfer roll and the can body blanks in various stages during the application of the extruded cement material to the blanks.
Figure 3:
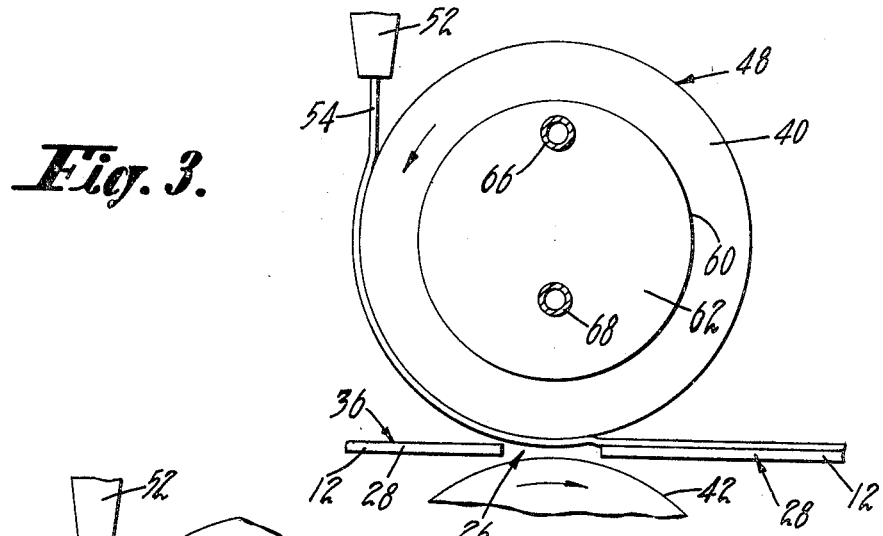
Figure 4:
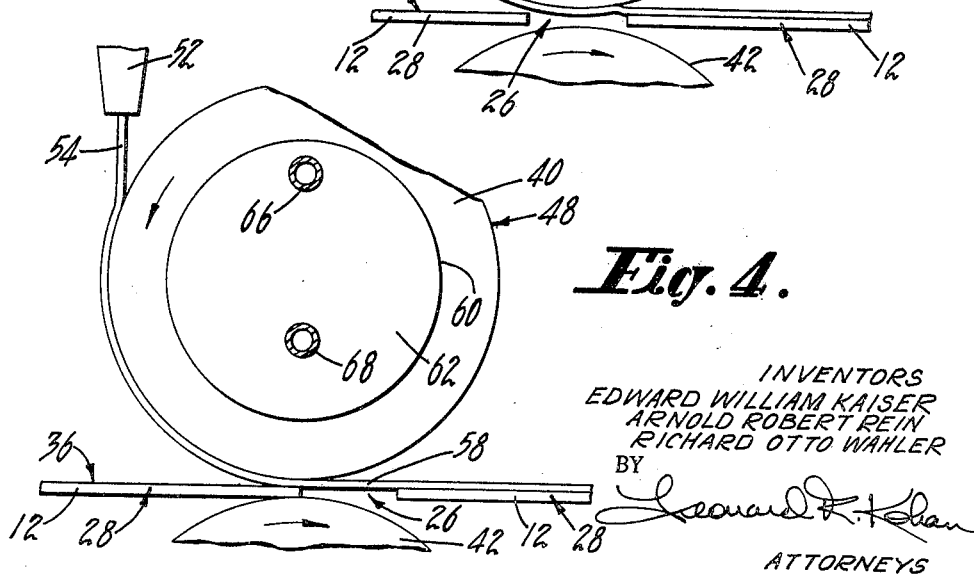

FIGS. 2 through 4 schematically illustrate the manner by which the deposition of the extruded ribbon 54 upon the heated marginal edge surface 36 of the blank 12 is effected. As previously described, the extruded ribbon 54 adheres with a substantial cohesive force to the surface 48 of the transfer roll 40 and is thereby carried into contact with a predetermined area of the heated marginal edge surface 36 of a blank. Upon being brought into contact with the heated marginal edge surface 36, a cohesive force is created between the marginal edge surface and the extruded ribbon 54 which is relatively much larger than the cohesive force existing between the extruded ribbon and the surface 48 of the transfer roll 40. The relatively large cohesive force between the extruded ribbon 54 and the heated marginal surface 36 acting in opposition to the lesser cohesive force between the extruded ribbon and the surface 48 of the transfer roll 40 causes the ribbon to be peeled away from the transfer roll and remain in bonding engagement with the marginal edge surface at the desired location thereon.

After a blank 12 completes its passage between the rolls 40 and 42, and until the next succeeding blank enters between the rolls, the continuously extruded ribbon 54 tends to remain in contact with the surface 48 of the transfer roll 40 because of the cohesive force which is present therebetween. At the same time, the portion of the ribbon 54 adhered to the blank 12 which has just emerged from between the rolls 40, 42 exerts a pulling force on the ribbon portion adhering to the surface of the transfer roll 40 tending to peel it away from the transfer roll (FIG. 3) and form it into a continuously extending free portion 58. As the blanks 12 continue to advance, the ribbon 54 is brought into bonding contact with the next succeeding blank with the free portion 58 bridging the space 26 and continuously interconnecting the adjacent blanks (FIG. 4).

The temperatures required at the heated marginal surface 36 of the blank 12, and the surface 48 of the transfer roll 40, in order to get the desired relationship of the magnitudes of the cohesive forces between these surfaces and the extruded ribbon 54 depends upon the character of the thermoplastic material. For the thermoplastic resin compositions generally employed in the manufacture of cemented side seam containers, we have found that the temperature to which the marginal surface 36 of a blank 12 must be heated in order to achieve reliable transfer of the extruded ribbon 54 to the blanks will be in the range of 350° to 500° F. Also, the extruded ribbon 54 adequately adheres to the surface 48 of the transfer roll 40, and at the same time may be pulled away from the transfer roll by the forces exerted on the ribbon by the heated marginal surface 36 of the blank, when the surface 48 of the transfer roller is maintained no higher than 175° F.

In order to achieve the desired control of the temperature of the surface 48 of the transfer roll 40, it is preferable to circulate a coolant internally of the roll. Referring to FIGURE 1, the transfer roll 40 is provided with internal passages (not shown) and a rotary union 60 to permit a cooling fluid such as tap water to be circulated through the passages as the roll revolves. The union 60 consists of a fixed hub 62 in sliding and sealing engagement with a rotating hub 64 which is attached to one end of the transfer roll 40. Inlet and outlet ports 66 and 68 respectively in the fixed hub 62 connect with channels in the rotating hub 64, which in turn connect with internal cooling passages in the transfer roll 40. The ports 66 and 68 are connected to a water supply and drain respectively, and the flow of water through the transfer roll 40 may be manually or automatically metered to maintain the required temperature at the roll surface 48.

If desired, the ribbon 54 may be further reduced in thickness while still in the heat-softened condition by advancing the marginal edge portion 38 of the blank 12 having the adhesive ribbon thereon between pinch rolls 70 and 72. The rolls 70 and 72 are mounted on respective shafts 74 and 76 which are suitably connected to the conveyor power source so that the peripheral speeds of the rolls are substantially the same as the speed at which the blanks are advanced by the conveyor.

As a blank 12 is further advanced along the conveyor path of travel, the marginal edge portion 38 having the adhesive ribbon 54 thereon passes through a cooling head 78 which is connected to a pressurized source of cooling air. The cooling head 78 directs cool air against the ribbon 54 to remove heat therefrom and reduce it to a temperature at which the thermoplastic material is relatively solid and self-supporting.

The blanks 12 interconnected by the solidified ribbon 54 next advance to a position wherein the ribbon is severed at the free portion thereof to produce the individual separated blanks. This is accomplished by a cutter 80 radially extended from a rotary disk member 82 mounted on a shaft 84, with the plane of rotation of the disk member and cutter being generally perpendicular to the path of travel of the blanks 12. The shaft 84 is suitably coupled to the conveyor power source to drive the disk member 82 at a predetermined speed of rotation such that the circumferential speed of the cutter 80 is considerably greater than the speed at which the blanks 12 are moved by the conveyor 10 along the path of travel. In addition, the couplings from the conveyor power source to the conveyor drive shaft 24 and shaft 84 respectively are positively correlated to move the cutter 80 through the space 26 between adjacent blanks 12 and sever a part of the free portion 58 of the ribbon 54 without contacting the adjacent blanks as the blanks move continuously along the path of travel. Guide rollers 86 engage the side edges 28 and 30 of the blanks 12 upstream and downstream of the cutter 80 to properly position the blanks relative to the cutter during the severing operation. The individual blanks 12 are finally delivered by the conveyor 10 to any suitable stacking or transfer means.

The cutter 80 has side surfaces 88 and 90 generally facing upstream and downstream respectively relative to the direction of travel of the blanks 12. Preferably, the surfaces 88 and 90 are slightly convergent in the radially outward direction, and the cutter 80 is adjustably mounted in the disk member 82 to permit radial adjustment of the cutter relative to the disk member. As schematically shown in FIGS. 5 and 6, the cutter 80 is radially positioned on the disk member 82 so that the widest distance between the portions of the side surfaces 88 and 90 which pass through the spacing 26 between the adjacent blanks 12 is less than the longitudinal width of the spacing 26. Also, the side surfaces 88 and 90 are spaced from the edges of the adjacent blanks 12 at the initiation and completion of the severing operation, with the cutter 80 being slightly offset in the downstream direction relative to the spacing 26 at the initiation of the severing operation to allow for the movement of the blanks 12 as the cutter passes between the blanks.

Due to the high relative magnitude of the circumferential speed of the cutter 80 as compared to the speed of travel of the blanks 12, the cutter severs and removes a part of the free portion 58 of the ribbon 54 and passes completely through the spacing 26 between the adjacent blanks while the blanks themselves move a relatively slight distance along their path of travel. As a result of the concurrent movement of the blanks 12 and cutter 80 at right angles to each other, a slight interference is present between the advancing severed edge of the ribbon 54 and the side surface 88 of the cutter. This interference is indicated on an exaggerated scale in FIG. 6. However, by moving the cutter 80 at a very high speed relative to the speed of the blanks 12, the effects of the interference are minimized and result in a rubbing action which does not detrimentally affect the severing operation. As indicated in FIG. 6, the side surface 88 of the cutter 80 is still spaced from the advancing edge of the blank 12 at the completion of the severing operation.

FIGS. 7 through 9 schematically illustrate a modified form of cutter 80A and its manner of operation. The cutter 80A has an upstream facing side surface 88A which is provided with rake, i.e., is angularly inclined in the direction opposite the movement of the cutter. The amount of rake or inclination is determined by the relative speeds of the cutter 80A and the blanks 12 and is at least great enough to preclude contact between the advancing severed edge of the ribbon 54 and the cutter surface 88A as the cutter severs the ribbon and moves through the spacing 26 between the adjacent blanks.

The severed individual blanks 12 have a slightly overhanging length of the ribbon 54 adjacent the leading and trailing edges thereof. This slight excess of adhesive material is subsequently removed in a conventional blank notching operation preparatory to forming a blank 12 into a container body.

From the foregoing description, it is apparent that the present invention provides a simple and efficient method and apparatus for applying a predetermined amount of a thermoplastic adhesive material in a precise location on the side seam marginal edge portion of a can body blank. Although thermoplastic adhesives have many recognized advantages over metallic solders in the manufacture of can bodies, their widespread use has heretofore been hindered by the absence in the art of suitable means for applying high strength thermoplastic to the surfaces to be bonded which would meet the requirements for commercial high speed automatic operation at low cost. The present invention fulfills the commercial need for such a method and apparatus and permits the utilization of any of the various thermoplastic resin compositions which are considered suitable for bonding the side seam of a can body without the disadvantages inherent in extruding the material directly upon a body blank or preforming a solid tape for subsequent application to a blank.

It is thought that the invention and many of its attendant advantages will be understood from the foregoing description and it will be apparent that various changes may be made in the form, construction and arrangement of parts of the apparatus mentioned herein and in the steps of their order of accomplishment of the process described herein, without departing from the spirit and scope of the invention or sacrificing all of its material advantages, the apparatus and process hereinbefore described being merely a preferred embodiment thereof.

What is claimed is:

1. A method of making a blank for a cemented lap side seam container body comprising the steps of
    advancing a procession of blanks along a path of travel at a uniform speed in a predetermined spaced relation,
    maintaining marginal edge surfaces of said blanks in alignment as they travel along said path,
    extruding a continuous ribbon of semi-molten adhesive material on to an endless transfer surface moving at substantially the same speed as said blanks,
    maintaining said transfer surface at a substantially lower temperature than the temperature of said marginal edge surfaces of said blanks,
    bringing said adhesive ribbon into contact with said marginal edge surfaces,
    transferring said adhesive ribbon from said transfer surface to said marginal edge surfaces by virtue of the substantial temperature difference therebetween,
    pressing said adhesive ribbon into bonding engagement with said marginal edge surfaces,
    bridging the spaces between said blanks by said continuous adhesive ribbon whereby said blanks are interconnected by said bridging portions of said adhesive ribbon,
    and cooling said adhesive ribbon to solidify the same.

2. The method set forth in claim 1 additionally including the step of
    preheating said marginal edge surfaces of said blanks prior to bringing said extruded adhesive ribbon into contact therewith.

3. The method set forth in claim 2 wherein said marginal edge surfaces are preheated by gas fired radiant heat.

4. The method set forth in claim 2 additionally including the step of
    flowing a coolant adjacent to said transfer surface to remove heat therefrom.

5. The method set forth in claim 1 additionally including the step of
    separating said blanks by severing said bridging portions of said adhesive ribbon as said blanks move continuously at said uniform speed.

6. The method set forth in claim 5 wherein said severance is effected by
    removing a length of said bridging portion of said adhesive ribbon, said length being less than the spacing between said blanks.

7. The method set forth in claim 6 wherein said length is removed by
    passing a cutter element between said blanks at a predetermined speed of magnitude relative to the speed of travel of said blanks such that said length is severed and removed without said cutter element coming into contact with that metal edge portions of said blanks.

8. Apparatus for depositing and positioning an adhesive material on a marginal edge surface of a blank to be formed into a container comprising
    a pair of rolls disposed along a path of travel comprising a transfer roll having a peripheral surface and a back-up roll,
    a conveyor adapted to continuously move a plurality of flat blanks in a spaced relation along said path of travel and between said rolls,
    means for maintaining marginal edge surfaces of said blanks in alignment and guiding said aligned marginal edge surfaces adjacent said peripheral surface as said blanks are conveyed along said path of travel,
    drive means coupled to said conveyor and said transfer roll adapted to maintain the speed of said peripheral surface substantially equal to the speed of said conveyor,
    an extrusion nozzle disposed adjacent said peripheral surface adapted to continuously extrude a ribbon of semi-molten adhesive material thereon, and
    means for maintaining said peripheral surface of said transfer roll at a substantially lower temperature than the temperature of said marginal edge surface of said blanks whereby said continuous adhesive ribbon separates from said peripheral surface and adheres and is transferred to said marginal edge surfaces of said blanks and bridges the spaces between said blanks.

9. The apparatus set forth in claim 8 wherein said means for maintaining said peripheral surface at a substantially lower temperature than said marginal edge surfaces of said blanks comprises,
    heating means disposed along said path of travel adapted to heat said marginal edge surfaces immediately prior to the passage of said blank between said rolls,
    and means for continuously circulating a cooling medium internally of said transfer roll.

10. The apparatus set forth in claim 9 wherein said heating means comprises gas fired radiant burners.

11. The apparatus set forth in claim 8 additionally including
    means for cooling said ribbon of adhesive material adhering to and interconnecting said blanks,
    a movable cutter element,
    and means for moving said cutter element between said blanks to sever and remove a length of said ribbon which bridges the space between successive blanks, said cutter moving means being adapted to move said cutter element at a speed and with a timing correlated with the continuous movement of said blanks and to move said cutter element through said spaces without coming into contact with said blanks.

12. The apparatus set forth in claim 11 wherein said cutter element has a maximum width as measured in the direction of travel of said blanks which is less than the spacing between said blanks.

13. The apparatus set forth in claim 11 wherein said cutter element is rotatably mounted with the plane of rotation being substantially normal to the path of travel of said blanks.

14. The apparatus set forth in claim 13 wherein said cutter moving means is adapted to move said cutter element at a substantially greater speed than the speed of travel of said blanks whereby said cutter element moves a distance equal to the combined thicknesses of said blank and said adhesive ribbon plus the thickness of said cutter element as measured in the circumferential direction while said blanks move a relatively small distance along said path of travel.

15. The apparatus set forth in claim 13 wherein said cutter element has a surface generally facing opposite the direction of travel of said blanks as said cutter element moves through said spaces, said surface being provided with rake whereby said surface receds from the adjacent severed edge of said adhesive ribbon during the simultaneous movements of said blanks along said path of travel and the cutter element through the space between adjacent blanks.

16. An apparatus for making blanks for cemented lap side seam container bodies comprising a conveyor for supporting and continuously moving a plurality of blanks at a uniform speed along a path of travel, spacing means on said conveyor for maintaining said blanks in a predetermined uniform spaced relation, aligning means for maintaining marginal edge surfaces of said blanks in alignment on said conveyor, heater elements disposed adjacent said conveyor adapted to heat said aligned marginal edge surfaces, a driven transfer roll mounted adjacent said conveyor and having a peripheral surface moving at substantially the same speed as the speed of said conveyor, an extrusion nozzle disposed adjacent said transfer roll adapted to extrude a continuous ribbon of molten thermoplastic material on to said peripheral surface, a predetermined spacing between said peripheral surface and said marginal edge surfaces whereby said transfer roll is adapted to carry and press said extruded ribbon into contact with said heated marginal edge surfaces as said blanks are conveyed past said transfer roll, means for circulating a cooling medium internally of said transfer roll to maintain the temperature of said peripheral surface substantially lower than the temperature of said marginal edge surfaces whereby said extruded ribbon preferentially adheres and is transferred to said marginal edge surfaces and bridges the spacings between said blanks, means for cooling said adhesive ribbon after it has been transferred to said marginal edge surfaces, and cutter means for removing a part of the bridging portions of said ribbon which interconnects said blanks as said blanks are continuously moved without interruption, said cutter means having a speed and timing correlated with the continuous movement of said blanks to cut and remove said part without contacting said metal blanks.

17. The method defined in claim 1 wherein said ribbon is extruded at a linear velocity which is less than that of said transfer surface to exert tension on said continuous ribbon and thereby reduce it in cross-sectional area.

18. The apparatus defined in claim 8 wherein said extrusion nozzle is adapted to extrude said ribbon at a velocity less than that of said peripheral surface to exert a tension on said extruded ribbon.

References Cited
UNITED STATES PATENTS

| | | | |
|---|---|---|---|
| 2,826,525 | 3/1958 | Blakslee et al. | 220—75 X |
| 3,066,063 | 11/1962 | Ecklund et al. | 156—244 X |
| 3,239,402 | 3/1966 | Ecklund et al. | 156—244 X |
| 3,323,965 | 6/1967 | Hanle et al. | 156—244 |
| 3,328,220 | 6/1967 | Harding | 156—244 X |

HAROLD ANSHER, Primary Examiner

T. R. SAVOIE, Assistant Examiner

U.S. Cl. X.R.

156—244, 500; 220—75